United States Patent Office 2,824,146
Patented Feb. 18, 1958

2,824,146

ALKYLATION PROCESS USING METAL PYROPHOSPHATE HYDRATE-BF$_3$ CATALYST

Joe T. Kelly, Dickinson, and Harmon M. Knight, La Marque, Tex., assignors to The American Oil Company, Texas City, Tex., a corporation of Texas Application July 16, 1956, Serial No. 597,918

15 Claims. (Cl. 260—671)

This invention relates to the reaction of isoparaffins or aromatic hydrocarbons and olefins. More particularly it relates to the alkylation of isobutane with ethylene. This application is a continuation-in-part of our copending application, Serial No. 580,256, filed April 24, 1956, now abandoned.

In the petroleum industry today, the octane race has placed a strain on facilities and materials needed to make gasoline meeting present day automotive engine requirements. One of the remaining sources of high octane components is the product of the alkylation of isobutane and ethylene. This alkylation is not easy to carry out, particularly on a large scale.

An object of the invention is the alkylation of isoparaffins, particularly isobutane, with olefins, particularly ethylene. A particular object is the direct preparation of substantially pure di-isopropyl. Another object is the alkylation of aromatic hydrocarbons with olefins. Still another object is a process for polymerizing ethylene. A further object is a process for converting gem type branched chain paraffins to non-gem type branched chain paraffins. Other objects will become apparent in the course of the detailed description.

The alkylation of isoparaffins or aromatic hydrocarbons with olefins is carried out in the presence of a novel catalyst pair. One member of the catalyst pair is boron trifluoride. The other member of the catalyst pair is a metal pyrophosphate hydrate, that is, a metal pyrophosphate salt containing water of hydration. Although the second component of the catalyst pair is spoken of as a metal pyrophosphate hydrate, it is believed that the solid member is more properly a complex of the hereinafter defined metal pyrophosphate hydrate and BF$_3$; the BF$_3$ is believed to complex with some or all of the hydrate water present in the metal pyrophosphate hydrate salt. More than the amount of BF$_3$ needed to complex the water of hydration is necessary to obtain the desired catalytic effect.

Boron trifluoride is one member of the catalyst pair. Commercial grade anhydrous boron trifluoride may be utilized as this member of the catalyst pair.

The other member of the catalyst pair, hereinafter spoken of as the solid member, is a metal pyrophosphate hydrate, i. e., a metal pyrophosphate salt containing water of hydration. The salt may be used as a fine powder, as pellets, or may be supported on a solid carrier such as alumina, charcoal, silica gel, silicon carbide, etc. Not all metal pyrophosphates which contain water of hydration are suitable, nor are all metal ions suitable. The particular metal component of the pyrophosphate salt hydrates is aluminum, beryllium, cadmium, cobaltous, cuprous, ferrous, ferric, manganous, nickelous, stannic, thorium, titanium, zinc and zirconium. In determining the effective members, it has been considered that the catalyst pairs which did not produce a yield, on a weight percent basis on ethylene charged, when isobutane and ethylene were contacted, of 100% or more, were unsuitable.

It is necessary that the above-defined metal pyrophosphate salts contain hydrate water. The anhydrous salts do not have any appreciable promotional effect on the activity of BF$_3$. In those cases wherein a salt may exist in forms having various amounts of water of hydration present, it is not necessary that any particular hydrate be used. Apparently it is necessary only that some water of hydration be present.

The BF$_3$ and the defined salt react to form a solid material containing complexed BF$_3$. When the salt hydrate and BF$_3$ are contacted in a closed vessel, the BF$_3$ partial pressure drops very rapidly at first and then gradually approaches a constant value. It appears that a very rapid reaction between the BF$_3$ and some of the water of hydration takes place. This initially rapid reaction is then followed by a relatively slow reaction between the remaining molecules of hydrate water and additional BF$_3$. In the case of ferric pyrophosphate containing 11 moles of hydrate water per mole of the salt, it appears that 4 or 5 moles of hydrate water are rapidly reacted. However, stirring of finely powdered hydrate salt in the presence of excess BF$_3$ at about room temperature for a period of about 20 hours, results in the reaction of 1 mole of BF$_3$ for each mole of hydrate water present in the ferric pyrophosphate hydrate. It appears that when the salt hydrate is exposed to BF$_3$, even in the presence of hydrocarbon reactants, eventually all of the water of hydration will become associated with BF$_3$ on about a 1 mole of BF$_3$ per mole of hydrate water basis.

A complex of the defined salt hydrate and BF$_3$ is not an effective catalyst for the alkylation in the absence of free-BF$_3$. Free-BF$_3$ is to be understood as BF$_3$ existing in the reaction zone which is not complexed with the defined metal pyrophosphate-hydrate. As soon as the salt hydrate has complexed with some BF$_3$, the beneficial catalytic effect exists. Thus free-BF$_3$ may exist in the reaction zone, as evidenced by the formation of alkylate, even though all of the hydrate water has not been complexed. In a batch system, wherein less BF$_3$ is present than is theoretically required to complex all the water of hydration present in the salt hydrate, eventually no alkylation will occur as charge is added, since all of the BF$_3$ will become complexed.

In general, the process is carried out utilizing an amount of $BF_3$ which is in excess of that required to complex with all the hydrate water present in the contacting zone, namely, in excess of about 1 mole of $BF_3$ per mole of hydrate water present. More than the minimum amount of free-$BF_3$ is beneficial, in fact, the yield of alkylate increases rapidly with increase in free-$BF_3$ present, up to a maximum amount. The amount of free-$BF_3$ used is dependent somewhat upon the reactants themselves. When reacting isoparaffins and olefins, the free-$BF_3$ usage is desirably, set out on a $BF_3$ to olefin weight ratio, of at least about 0.2. In other words, at least about 0.2 lb. of $BF_3$ per lb. of olefin charged to the alkylation zone is desirable. About 1.5 parts by weight of $BF_3$ per part of olefin charged appears to be about the desirable maximum usage of $BF_3$. It is preferred to use between about 0.35 and 1 part by weight of free-$BF_3$ per part by weight of olefin when utilizing the lower molecular weight olefin, such as ethylene and propylene. (When very high isoparaffin to olefin molar ratios, such as 15–25 to 1, are used the amount of $BF_3$ present should be increased beyond the above set out amounts.)

The process may be carried out at any temperature below the temperature at which the salt hydrate decomposes, that is, loss of all its water of hydration. The temperatures of operation may be as low as $-25°$ C. or even lower. Temperatures as high as 150° C. and even higher may be used with some of the salt hydrates which have relatively high decomposition temperatures. For example, ferric pyrophosphate.$5H_2O$ has been heated for 20 hours at 168° C. without losing water of hydration. More usually the temperature of operation will be below about 30° C. Low temperatures favor the formation of the hydrocarbons having 6 to 7 carbon atoms and di-isopropyl in ethylene-isobutane reaction. It is preferred to operate at a temperature between about $-25°$ C. and $+5°$ C.

Sufficient pressure is maintained on the system to keep a substantial portion of the hydrocarbons charged in the liquid state. The process may be carried out at relatively low pressures, for example, 100 p. s. i., or it may be carried out at elevated pressures, for example, 2000 p. s. i., or more. In general, pressures will be between about 200 and 1000 p. s. i. and preferably between about 300 and 600 p. s. i.

The contacting of the isoparaffin or aromatic hydrocarbon and the olefin in the presence of the defined catalyst pair is continued until an appreciable amount of alkylate has been formed. In batch reactions, it is possible to virtually extinguish the olefin, i. e., convert substantially 100% of the olefin by a sufficiently long period of contacting. When operating in a continuous flow system, it may be desirable to have a time of contacting such that substantial amounts of olefin are not converted and obtain the complete conversion of the olefin by a recycle operation. The time of reaction will be determined by the type of hydrocarbons charged, the ratio of isoparaffin or aromatic to olefin, the degree of mixing in the contacting zone and the catalyst usage. A few tests will enable one to determine the optimum time of contacting for the particular system of operating conditions being tried.

The reactants in the hydrocarbon charge to the alkylation process are isoparaffin, or aromatic and olefin. The olefin contains from 2 to about 12 carbon atoms. Examples of suitable olefins are ethylene, propylene, butene-2, hexene and octene; in addition to these, the olefin polymers obtained from propylene and/or butylene are also suitable for use in the process, such as codimer, propylene trimer, propylene tetramer and butylene trimer. It is preferred to operate with ethylene or propylene.

The aromatic hydrocarbons must be alkylatable by the particular olefin used. It is self-evident that an aromatic hydrocarbon which contains alkyl substituents positioned so that steric hindrance would prevent or greatly reduce the possibility of alkylation with the particular olefin should not be subjected to the process. Examples of particularly suitable aromatic hydrocarbons are benzene, toluene, xylene, trimethylbenzenes, and the other alkyl analogues, such as propyl and butyl, the naphthalene aromatic hydrocarbons, such as the mono and di-substituted methylnaphthalenes.

The isoparaffin reactant is defined as a paraffinic hydrocarbon which has a tertiary hydrogen atom, i. e., paraffins which have a hydrocarbon atom attached to a tertiary carbon atom. Examples of these are isobutane, isopentane (2-methylbutane), 2-methylpentane, 2-methylhexane, 3-methylhexane, 2,3-dimethylbutane (di-isopropyl) and 2,4-dimethylhexane. Thus the isoparaffins usable as one reactant in the process contain from 4 to 8 carbon atoms.

In the isoparaffin-olefin system, the alkylation reaction is more favored as the mole ratio of isoparaffin to olefin increases. In general, the isoparaffin to olefin mole ratio in the hydrocarbon charge should be at least 1. More than this amount is good and it is desirable to have an isoparaffin to olefin ratio between about 2 and 25 and in some cases more, for example, as much as 50. It is preferred to operate with an isoparaffin to olefin mole ratio of between about 5 and 15.

The presence of non-reactive hydrocarbons in the hydrocarbon charge is not detrimental unless the reactants become excessively diluted. For example, the isoparaffin may also contain isomers of the normal configuration. The olefins may contain paraffins of the same carbon number. Mixtures of 2 or more isoparaffins or 2 or more aromatic hydrocarbons, or 2 or more olefins may be charged. In general, when a particular product distribution is desired, it is preferable to operate with a single isoparaffin and a single olefin, for example, technical grade isobutane and ethylene, i. e., about 95% purity.

The reactants may be mixed together before they are charged into the reactor. Or, they may be charged into the reactor separately. Or, a portion of the olefin may be blended with the isoparaffin or aromatic before introduction into the reactor and the remainder of the olefin injected into the reactor. The charge may be introduced all at one point into the reactor or it may be introduced at 2 or more points. The alkylation reaction is somewhat exothermic and temperature control is facilitated by introducing the olefin into the reactor at more than one point.

The $BF_3$ member of the catalyst pair may be premixed with the isoparaffin and olefin before introducing these into the reactor but this should not be done when an extremely reactive system such as isobutanes and isobutylene or aromatic hydrocarbons and olefins are being used; or when an olefin that is very rapidly polymerizable is being used. The $BF_3$ may be blended with the isoparaffin reactant and introduced into the reactor with this member when the isoparaffin and the olefins are being introduced separately. The $BF_3$ may also be introduced directly into the reaction zone independently from the hydrocarbons charged. The $BF_3$ may be introduced into the reactor at a single point or at several points to help control temperature and reaction rate.

The reactor may be a vessel providing for a batch-type reaction, i. e., one wherein the desired amount of isoparaffin or aromatic and olefin are charged to a closed vessel containing the catalyst pair and the vessel then maintained at the desired temperature for the desired time. At the end of this time, the hydrocarbon product mixture and unreacted materials are withdrawn from the vessel and processed to separate the alkylate product from the unreacted materials and lower and higher molecular weight materials. The reactor may be a fixed bed operation wherein the reactants and free-$BF_3$ are flowed through the bed of the hydrate salt member of the catalyst pair, the space velocity being controlled so that the desired amount of reaction is obtained during the passage of the reactants through the bed of hydrate salt. Under some conditions, a moving bed of hydrate salt may be utilized. In still another set of circumstances, a fluidized bed of hydrate salt may be utilized with the incoming stream of reactants providing the energy for the fluidization of the solid hydrate salt. Other methods of operation common in the catalytic refining aspects of the petroleum industry utilizing solid catalyst may be readily devised.

It has been pointed out that the solid member of the catalyst pair is really a complex of the metal pyrophosphate-salt hydrate and $BF_3$; the $BF_3$ apparently reacting with the water of hydration. The complex may be preformed, by exposing the salt hydrate to $BF_3$ for a time sufficient to introduce some $BF_3$ into the solid component or even enough to complex all of the water of hydration; this being done before the reactants are introduced into the reaction zone or even before the solid member of the catalyst pair is positioned in the reaction zone. The complex may be formed in situ during a batch-type reaction. In the batch-type operation, it is convenient to introduce all the $BF_3$ into the reaction vessel at once. This amount of $BF_3$ is sufficient not only to complex with the water of hydration but also provide the desired amount of free-$BF_3$. In a flow system, the solid member may be prepared in situ by charging fresh hydrate salt to the reaction zone and forming the complex during the initial passage of reactants and $BF_3$ over the salt hydrate. Some alkylation reaction occurs even though the salt hydrate has not taken up sufficient $BF_3$ to complex all the water of hydration. As the flow of reactants and $BF_3$ continues over the solid member, eventually the salt hydrate will become saturated with respect to $BF_3$. At this time, the amount of $BF_3$ introduced into the reaction zone should be cut back to that amount of free-$BF_3$ desired, under this particular set of operating conditions.

Figure 1:
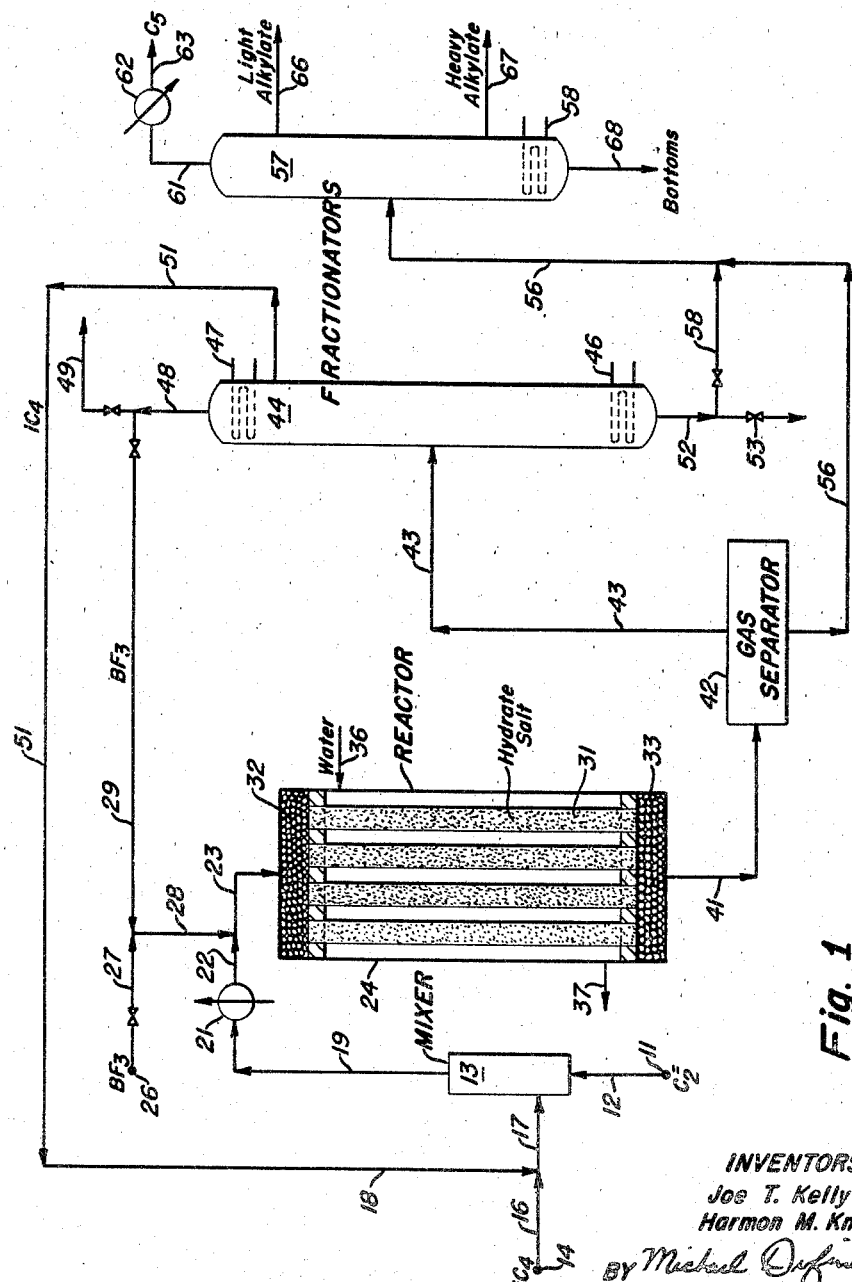
Figure 1 shows an illustrative embodiment of one mode of utilizing the process of this invention.

The illustrative embodiment set out in annexed Figure 1 forms a part of this specification. It is pointed out that this embodiment is schematic in nature, that many items of process equipment have been omitted, since these may be readily added by those skilled in this art and that this embodiment is only one of many which may be devised, and that the invention is not to be limited to this particular embodiment.

In Figure 1, it is desired to produce a high yield of diisopropyl for use as a blending material for gasoline. Ethylene from source 11 is passed by way of line 12 into mixer 13. Liquid isobutane from source 14 is passed by way of lines 16 and 17 into mixer 13. Both the ethylene and the isobutane are about 90% purity, the remainder being n-butane and ethane, with trace amounts of other components found in materials derived from petroleum refining sources. Mixer 13, in this instance, is a simple orifice-type mixer suitable for intermingling a liquid and a gas, or two liquids. Recycle isobutane from line 18 is passed by way of line 17 into mixer 13. In this embodiment, the molar ratio of isobutane to ethylene is 6.

From mixer 13, the blend of isobutane and ethylene is passed by way of line 19, through heat exchanger 21, where the temperature of the blend is adjusted to 30° C. The temperature of the blend leaving exchanger 21 is somewhat lower than the reaction temperature, since there is a heat rise in the reactor due to exothermic reaction. From exchanger 21, the stream of isobutane and ethylene is passed by way of lines 22 and 23 into the top of reactor 24.

Boron trifluoride is passed from source 26 by way of valved line 27 and line 28 into line 23, where it meets the stream of isobutane and ethylene. If desirable, a mixer may be introduced into line 23 to insure complete intermingling of the $BF_3$ and the hydrocarbon charged. Recycle $BF_3$ is introduced from line 29 by way of lines 28 and 23. In this embodiment, the salt hydrate is completely complexed with respect to $BF_3$ and only the necessary free-$BF_3$ is introduced by way of line 28. The weight ratio of free-$BF_3$ from line 28 to ethylene present in line 23 is 1.1.

Reactor 24 is shown as a shell and tube type vessel. Hydrate salt is contained in the tubes 31. The alumina balls 32 and 33 are positioned above and below the headers in the reactor to maintain the hydrate salt within the tubes. In order to maintain the temperature in the reactor at substantially 35° C., water is introduced into the shell side by way of line 36 and is withdrawn by way of line 37.

In this embodiment, the reactor was charged with ferric pyrophosphate containing 5 moles of water of hydration per mole of pyrophosphate. The hydrate salt was preformed into pellets about one-eighth inch in diameter and about one-eighth inch in height. Some silica was present to act as a lubricant in the extrusion of the pellets. The salt hydrate was contacted with $BF_3$ in an amount such that all of the water of hydration was complexed with $BF_3$. This operation was carried out before reactants were introduced into the reactor. The reactor pressure was maintained at 600 p. s. i. This permits maintaining the isobutane and substantially all of the ethylene in the liquid state.

The product hydrocarbon mixture is passed out of reactor 24 by way of line 41. This stream contains the alkylate product, unreacted isobutane, a small amount of unreacted ethylene and pentanes as well as $BF_3$. The stream from line 41 is passed into gas separator 42 where the $BF_3$, isobutane, some pentanes and some alkylate product are taken overhead by way of line 43. The material taken overhead from the separator 42 is passed into fractionator 44.

Fractionator 44 is adapted to separate the $BF_3$ as a gas, the isobutane as a liquid and the higher boiling materials as a bottoms product. Fractionator 44 is provided with an internal reboiler 46 and an internal condensor 47. $BF_3$ and unreacted ethylene are taken overhead from fractionator 44 by way of line 48 and may be passed out of the system by way of valved line 49. The material from line 49 may be periodically passed to a $BF_3$ purification operation to remove non-condensable inert gases which build up in the system. Ordinarily the stream from line 48 is recycled by way of valved lines 29 and lines 28 and 23 to reactor 24.

Isobutane is withdrawn as a liquid stream by way of line 51 and is recycled by way of lines 18 and 17 to mixer 13 for reuse in the process. Bottoms product from fractionator 44 is withdrawn by way of line 52 and may be passed to storage or further processing by way of valved line 53. This stream from line 52 consists substantially of isopentane. Some unsaturated $C_5$ hydrocarbons are also present and also a small amount of higher boiling alkylate material.

The liquids separated in gas separator 42 are passed by way of line 56 into fractionator 57. The bottoms product from fractionator 44 may be passed by way of valved line 58 and line 56 into fractionator 57 for complete removal of the alkylate material. In this embodiment, the bottoms are passed to fractionator 57.

Fractionator 57 is provided with an internal reboiler 58 and is adapted to produce the desired alkylate products from the hydrocarbon product mixture entering from line 56. A vapor stream is taken overhead by way of line 61, is condensed in cooler 62 and is passed to storage by way of line 63. The material from line 63 consists substantially of isopentane and some unsaturated $C_5$ material. This material may be used as a high octane blending stock for the production of motor gasoline of the desired volatility characteristics.

The alkylate product herein is considered to be that boiling above the pentane range and boiling below the maximum temperature usable in motor gasoline. In general, a 415° F. endpoint alkylate is blendable into motor gasoline without adverse effect in a specification calling for a 400° F. gasoline endpoint. Thus the alkylate product is considered to be the material boiling between about the lower limit of the hexane range and 415° F. in the ASTM distillation procedure.

A considerable difference exists between the octane number of the $C_6$ fraction of the alkylate product and the higher boiling material. The $C_6$ fraction, which boils from about 110° to 170° F., has an F-1 octane number of 101. The $C_7+$ material has an octane number which ranges between about 75 and 85, depending somewhat on the fractionation.

Light alkylate, which includes all the $C_6$ material and some of the $C_7$ material, is withdrawn from fractionator 51 by way of line 66. Heavy alkylate, which includes most of the $C_7$ and material boiling up to 415° F. is withdrawn from fractionator 57 by way of line 67. A small amount of higher boiling bottoms is withdrawn by way of line 68.

In general, the $C_6$ fraction of the alkylate product will contain from about 86 to about 90 mole percent of di-isopropyl (2,3-dimethylbutane). 2-methylpentane and 3-methylpentane represent substantially the remainder of the $C_6$ product. Generally, only trace amounts of n-hexane are present.

The results obtainable by the process of the instant invention are set out in numerous illustrative runs below. These runs not only illustrate the types of metal pyrophosphate hydrates which are suitable but also illustrate the effects of change in operating conditions.

In Tables I, II, and III, there are set out results in the testing of various metal pyrophosphate hydrates by means of batch operation. In these runs, the tests were carried out under what are more or less standard conditions, namely, a 4-liter carbon steel bomb was dried overnight in a stream of hot air at 110° C. The pyrophosphate to be tested (90 grams) was charged to the bomb as a powder and the bomb was evacuated. One kilogram of a dry blend of ethylene and isobutane was added and then $BF_3$ (90 grams) was pressured in. The charged bombs were placed in a rocker and allowed to rock for 20 hours. At the end of this time a liquid sample was drawn through a bomb containing activated alumina (to remove dissolved $BF_3$ and salt particles). This sample was submitted for Podbielniak distillation. A $C_6$ cut from the Podbielniak distillation was analyzed by mass spectrometer. In some cases after sampling, the remaining major portion of the product was debutanized on an Oldershaw column and then fractionated on a packed column.

In Table I, data are set out showing the importance of water of hydration in the system. In run No. 1, the operation was carried out as described above except that no salt was present in the bomb. The results show that only 34% of depentanized alkylate product was obtained by the use of $BF_3$ alone as the catalyst. Run No. 2, carried out with cobaltous pyrophosphate in the anhydrous form, produced no more alkylate than did $BF_3$ in the absence of pyrophosphate. Run No. 3, wherein cobaltous pyrophosphate.$7H_2O$ and $BF_3$ were present, produced a depentanized alkylate product yield of 188% based on ethylene charged and resulted in the conversion of all the ethylene charged.

TABLE I

*Presence of water of hydration*

| Run No. | 1 | 2 | 3 | 4 | 5 |
|---|---|---|---|---|---|
| Pyrophosphate | None | $Co_2P_2O_7$[2] | $Co_2P_2O_7.7H_2O$ | $Ni_2P_2O_7$[2] | $Ni_2P_2O_7.5H_2O$ |
| Conditions: | | | | | |
| Isobutane/Ethylene (molar) | 3.0 | 2.3 | 2.4 | 2.2 | 3.1 |
| Hydrocarbon/Salt (weight) | | 14.1 | 11.1 | 11.1 | 11.1 |
| $BF_3$/Ethylene (weight) | 0.7 | 0.5 | 0.8 | 0.3 | 0.7 |
| Time, Hours | 20 | 20 | 20 | 20 | 20 |
| Temperature, ° C | 25-35 | 25-35 | 25-35 | 25-35 | 25-35 |
| Pressure (Range), p. s. i. g | 300 | 420-285 | 400-205 | | 320-165 |
| Results: | | | | | |
| Alkylate (Depentanized)[1] (wt. percent)— | | | | | |
| Hexanes | 21 | 15 | 110 | 10 | [3] 110 |
| $C_7+$ | 13 | 20 | 78 | 9 | 98 |
| Total | 34 | 35 | 188 | 19 | 208 |
| Ethylene Converted, Percent | | | 100 | 73 | 96 |

[1] Podbielniak and mass spectrometer analyses, based on ethylene charged.
[2] Oven dried at 200-260° C. to remove hydrate water.
[3] 88% 2,3-dimethylbutane.

Runs 4 and 5 show that anhydrous nickelous pyrophosphate, in the presence of $BF_3$, gave a yield that was even lower than the $BF_3$ alone in run No. 1, whereas nickelous pyrophosphate.$5H_2O$ and $BF_3$ in run No. 5 produced a yield of 208% and converted essentially all of the ethylene charged. These runs show that water of hydration is necessary in order to have an effective catalyst pair.

In Table No. II, there was studied the effect of hydrate salt in the absence of $BF_3$. For convenience, run No. 1 has been set out again in this table, this run showing that $BF_3$ alone is a very feeble isobutane-ethylene alkylation catalyst. In run No. 6, ferric pyrophosphate.$4H_2O$ was charged to the bomb in the absence of $BF_3$. The results show that only about a 40% of the ethylene was converted and the alkylate yield was negligible. In run No. 7, wherein both members of the catalyst pair were present, the yield had leaped to 206% and all of the ethylene had been converted. In all of these runs, 3, 5 and 7, more $BF_3$ was present than was needed to complex with the water of hydration present.

In Table No. III, there are set out the results of testing various metal pyrophosphate hydrates. These data were obtained under the approximate standard conditions utilized in bomb work. These standard conditions are approximately: Isobutane-ethylene mole ratio, 2.4; hydrocarbon/salt weight ratio, 11; $BF_3$/ethylene weight ratio, 0.7; 20 hours' contacting time, temperature range 20-35° C. and an initial pressure of about 350 p. s. i. g. These runs show that the sodium acid pyrophosphate is completely ineffective as a member of the catalyst pair. Stannous pyrophosphate is ineffective; on the other hand, the stannic pyrophosphate is relatively effective as a member of the catalyst pair. Magnesium pyrophosphate hydrate is relatively fair and chromium is marginal in its effectiveness.

TABLE II

*Catalyst pair*

| Run No. | 1 | 6 | 7 |
|---|---|---|---|
| Fe₄(P₂O₇)₃.4H₂O | None | Yes | Yes |
| BF₃ | Yes | None | Yes |
| Conditions: | | | |
| Isobutane/Ethylene, molar | 3.0 | 2.7 | 3.1 |
| Hydrocarbon/Salt (weight) | | 11.1 | 12.5 |
| BF₃/Ethylene (weight) | 0.7 | | 0.9 |
| Time, Hours | 20 | 20 | 20 |
| Temperature, °C | 25–35 | 25–35 | 35–25 |
| Pressure (Range), p. s. i. g | 300 | 200 | 295–168 |
| Results: | | | |
| Alkylate [1] (wt. percent)— | | | |
| Pentanes | | 18 | 26 |
| Hexanes | 21 | 4 | 131 |
| C₇+ | 13 | | 75 |
| Alkylate (C₆+) | 34 | 4 | [2] 206 |
| Ethylene converted, percent | | | 100 |

[1] Based on ethylene charged.
[2] 8 wt. percent boiled above 415° F.

removed. Reactor temperature was controlled by an internal cooling tube and when necessary, external cooling water was applied.

The ferric pyrophosphate used in all the work was prepared by allowing Fe(NO₃)₃·9H₂O to react with tech grade Na₄P₂O₇. In a typical preparation: To about 18 liters of distilled water in a five-gallon bottle were added 1,000 gm. ferric nitrate, 265 gm. sodium pyrophosphate, and 50 ml. concentrated nitric acid. The resulting mass was stirred for about four hours and filtered. The precipitant was washed three times with 800-ml. portions of hot distilled water, then once with one pound of methanol. The ferric pyrophosphate was transferred to an evaporating dish and dried overnight at 110° C. in the forced draft oven.

The ferric pyrophosphate prepared in this manner was pelleted into one-eighth inch pellets using a small amount of silica as lubricant. It usually contained from 12 to 20 moles of molecular and absorbed water as shown by analysis (loss on heating at 400° C.). This molecular

TABLE III

*Various pyrophosphate hydrates*

| Run No. | 8 | 9 | 10 | 11 | 12 | 13 | 14 | 15 | 16 | 17 |
|---|---|---|---|---|---|---|---|---|---|---|
| Metal Ion Present | Aluminum³⁺ | Beryllium²⁺ | Cadmium²⁺ | Cobalt²⁺ | Chromium³⁺ | Copper²⁺ | Ferrous²⁺ | Ferric³⁺ | Mercury²⁺ | Magnesium²⁺ |
| Moles of Water of Hydration | 8 | 3 | 2 | 7 | 7–8 | 2 | 2 | 4 | 2 | 3 |
| Ethylene Converted, percent | 96 | 96 | 92 | 100 | 77 | 100 | 95 | 100 | 100 | 59 |
| Alkylate (Wt. percent)[1]: | | | | | | | | | | |
| Isopentane | 23 | 22 | 6 | | | | 19 | 26 | | |
| Hexanes | 92 | 101 | 97 | 110 | 78 | 87 | 101 | 131 | Tr. | 21 |
| C₇+ | 47 | 81 | 77 | 78 | 16 | 53 | 88 | 75 | 80 | 44 |
| Total (C₅ Free) | 139 | 182 | 174 | 188 | 94 | 140 | 189 | 206 | 80 | 65 |

| Run No. | 18 | 19 | 20 | 21 | 22 | 23 | 24 | 25 | 26 |
|---|---|---|---|---|---|---|---|---|---|
| Metal Ion Present | Manganese²⁺ | Sodium Acid | Nickel²⁺ | Stannous²⁺ | Stannic⁴⁺ | Thorium⁴⁺ | Titanium³⁺ | Zinc²⁺ | Zirconium⁴⁺ |
| Moles of Water of Hydration | 1–2 | 1 | 4 | 0.5 | 1–2 | 3–4 | 4–5 | 1–2 | 1 |
| Ethylene Converted, percent | 92 | | 95 | 41 | 82 | 88 | 92 | 65 | 80 |
| Alkylate (Wt. percent)[1]: | | | | | | | | | |
| Isopentane | 8 | | | 12 | 21 | | | | 13 |
| Hexanes | 68 | | 120 | 24 | 56 | 65 | 112 | 57 | 66 |
| C₇+ | 94 | | 80 | 8 | 64 | 83 | 18 | 69 | 67 |
| Total (C₅ Free) | 162 | 10 | 200 | 32 | 120 | 148 | 130 | 126 | 133 |

[1] Based on ethylene charged.

Although mercury pyrophosphate appears to be ineffective as an alkylation catalyst, analysis of the product hydrocarbon mixture plus the high ethylene conversion shows that this salt is an excellent ethylene polymerization catalyst in conjunction with BF₃.

In order to study the effect of various operating variables on this process, flow runs were carried out using ferric pyrophosphate.9H₂O as the hydrate salt. In the flow work, a fixed bed reactor was used which was provided with an internal cooling tube. The salt was first charged to the reactor, then the reactor was evacuated. BF₃ was allowed to flow into the reactor while the temperature was controlled at a point below 50° C. The BF₃ and salt were allowed to stand until a constant BF₃ pressure had been attained.

In starting a run, the reactor was usually filled with isobutane. Then the pump was started, causing the premixed isobutane-ethylene blend to flow from the charge tank through the drier downflow through the reactor. BF₃ was added continuously by absorption in the feed just before the feed entered the reactor. The reactor pressure was controlled manually by a valve at the reactor outlet. The reactor effluent was scrubbed by bubbling through a layer of distilled water in the product receiver. The BF₃ carried from the reactor was thus water was then reduced to 9 moles by controlled heating at 110° C. in a forced draft oven.

Figure 2:
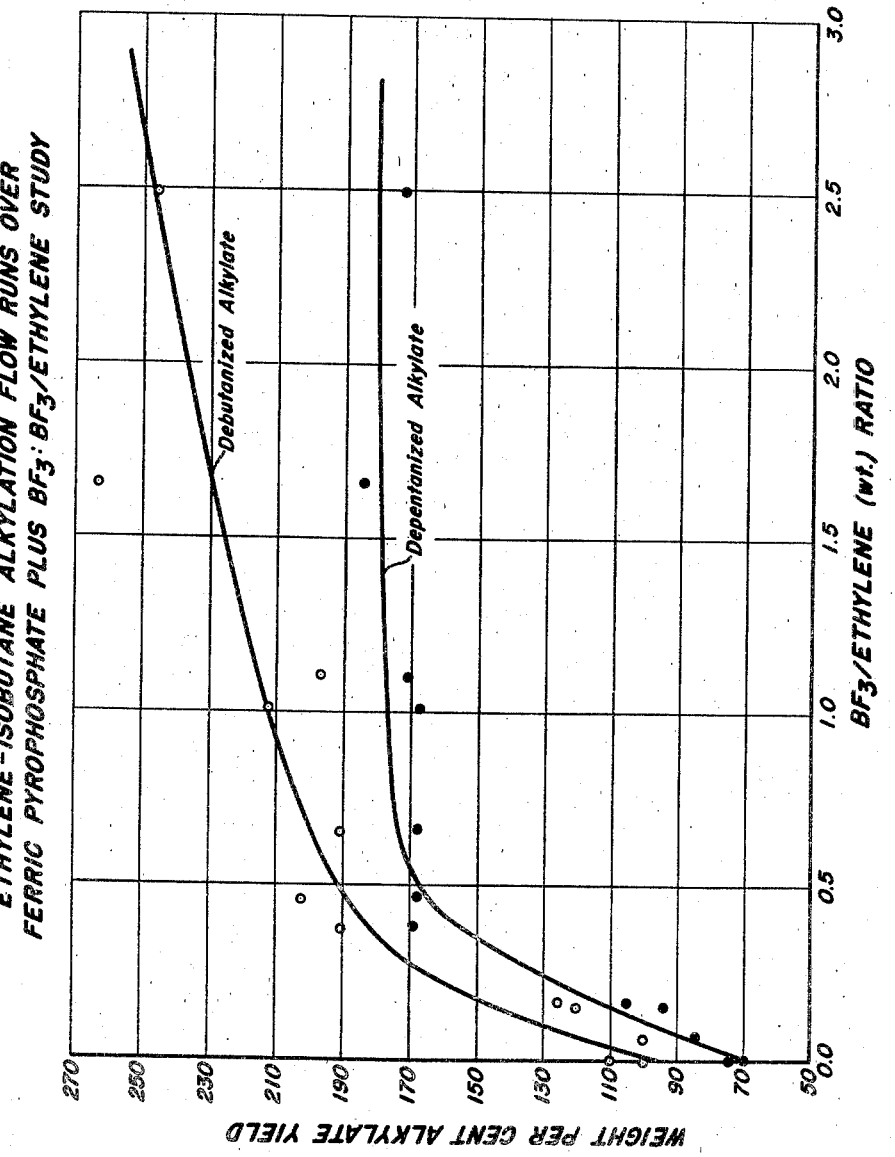
Figure 2 shows a plot of alkylate yield vs. $BF_3$/ethylene weight ratio in a flow operation using ethylene and isobutane reactants.

The effect of the free-BF₃ to ethylene ratio was studied and the results are shown in Table IV, as well as being plotted in Figure 2. Figure 2 shows very clearly that free-BF₃ is necessary even though the hydrate salt had been saturated with BF₃ prior to contacting the isobutane-ethylene mixture. Further, the data show that the yield of alkylate increases very rapidly with relatively small change in BF₃/ethylene ratio up to about 0.5. After this, the yield curve flattens out almost immediately and remains essentially constant up to the maximum ratio used in these runs, i. e., 2.5. The data and Figure 2 show this much more impressively and show that as the BF₃/ethylene ratio is increased, the amount of pentanes formed increases. The data indicate that the presence of large amounts of BF₃ tends to crack some of the alkylate product to produce more of the pentane boiling range material.

The effect of reactor temperature was studied and the results are shown in Table V. Runs 38 and 39 indicate that in the range of 0° C. to atmospheric temperatures, the yield is little affected by change in temperature. Runs 40 and 41 show that as the temperature was increased from the upper atmospheric level of about 35°

C. to moderately elevated temperatures on the order of 90° C., the yield of alkylate dropped very sharply. These runs indicate that atmospheric temperatures should be preferred when large yields are desired.

The effect of reactor pressure was studied and the results are shown in Table VI. These results seem to show that there is some advantage in keeping the reactor pressure below about 1000 p. s. i.

TABLE IV

*Effect of $BF_3$ to olefin ratio*

[Salt: Ferric pyrophosphate.$9H_2O$.]

| Run No. | 27 | 28 | 29 | 30 | 31 | 32 | 33 | 34 | 35 | 36 | 37 |
|---|---|---|---|---|---|---|---|---|---|---|---|
| Conditions: | | | | | | | | | | | |
| $BF_3$/Ethylene (Weight) | | .16 | .48 | 1.2 | 1.7 | 2.5 | .67 | .38 | .07 | .17 | 1.1 |
| Isobutane/Olefin (Molar) | 6.4 | 6.4 | 6.4 | 6.1 | 6.1 | 6.1 | 3.1 | 3.1 | 3.2 | 3.2 | 2.8 |
| Space Velocity (Wt.HC/Hr./Wt.Salt) | 0.28 | 0.30 | 0.28 | 0.27 | 0.28 | 0.28 | 0.40 | 0.35 | 0.40 | 0.38 | 0.46 |
| Hydrocarbon/$BF_3$ (Weight) | | 91.8/1 | 31.5/1 | 12.0/1 | 8.4/1 | 5.7/1 | 11.8/1 | 19.9/1 | 112.5/1 | 45.5/1 | 6.2/1 |
| Run Length (Hours) | 4.0 | 4.0 | 4.0 | 4.5 | 4.0 | 4.0 | 8.0 | 8.0 | 6.5 | 6.0 | 6.0 |
| Temperature Range (°C.) | 30-35 | 30-35 | 30-35 | 30-35 | 30-35 | 30-35 | 30-40 | 30-40 | 30-35 | 30-35 | 30-40 |
| Average Pressure (p. s. i. g.) | 600 | 600 | 600 | 600 | 600 | 600 | 600 | 600 | 600 | 600 | 600 |
| Yields (Wt. percent on $C_2$=Charged—based on Pody and MS Analyses): | | | | | | | | | | | |
| i-$C_5$ and $C_5$= | 40 | 25 | 34 | 45 | 77 | 72 | 23 | 21 | 14 | 19 | 23 |
| $C_6$ | 32 | 47 | 68 | 92 | 96 | 83 | 69 | 65 | 30 | 34 | 54 |
| $C_7$ | 38 | 48 | 101 | 76 | 89 | 90 | 99 | 105 | 55 | 73 | 117 |
| Alkylate (Depentanized) | 70 | 95 | 169 | 168 | 185 | 173 | 168 | 170 | 85 | 107 | 171 |
| Alkylate (Debutanized) | 110 | 120 | 203 | 213 | 262 | 245 | 191 | 191 | 99 | 126 | 194 |
| Ethylene Converted, percent | 78 | 67 | 90 | 92 | 98 | 99 | 99 | 94 | 70 | 78 | 100 |

TABLE V

*Effect of reaction temperature*

[Salt: Ferric pyrophosphate.$9H_2O$.]

| Run No. | 38 | 39 | 40 | 41 |
|---|---|---|---|---|
| Conditions: | | | | |
| Temperature (° C.) | 27-36 | 0-2 | 30-40 | 50-90 |
| Isobutane/Ethylene (Molar) | 11.0 | 11.0 | 5.9 | 6.0 |
| Space Velocity (Wt.HC/Hr./Wt.Salt) | 0.27 | 0.28 | 0.46 | 0.46 |
| $BF_3$/Ethylene (Weight) | 2.3 | 2.0 | 1.3 | 1.4 |
| Hydrocarbon/$BF_3$ (Weight) | 10.5 | 12.4 | 10.3 | 10.1 |
| Run Length (Hours) | 9 | 20 | 10 | 10 |
| Average Pressure (p. s. i. g.) | 600 | 600 | 600 | 600 |
| Yields (Wt. Percent on $C_2$= Charged—based on Pody and MS Analyses): | | | | |
| i-$C_5$ and $C_5$= | 53 | 40 | 28 | 0 |
| $C_6$ | 73 | 85 | 82 | 90 |
| $C_7$+ | 61 | 45 | 103 | 30 |
| Alkylate (Depentanized) | 134 | 130 | 185 | 120 |
| Alkylate (Debutanized) | 187 | 170 | 213 | 120 |
| Ethylene Converted, Percent | 93 | 100 | 96 | 89 |

The data set out in Table VII indicate that within the range of isobutane/ethylene mole ratio of about 3 to 10, no great change is produced in the alkylate yield but some increase in $C_6$ to $C_7$+ product ratio resulted. Run No. 48 shows, by the lower ethylene conversion, that the catalyst had become partially deactivated by the time this run had been reached.

Table No. VIII contains data on the effect of space velocity on yield. These runs show that as the space velocity is increased, the alkylate yield progressively decreases and also the ethylene conversion decreases.

RUNS 53 AND 54

In these runs, $Ni_2P_2O_7.4H_2O$ and $BF_3$ were used as the catalyst pair for the alkylation of isobutane with butene-2 (run No. 53) and a mixture of ethylene and propylene (run No. 54). In run No. 53, the batch reactor was charged with 100 grams of powdered salt, 1123 grams of isobutane and 100 grams of commercial anhydrous $BF_3$. Over a period of 2½ hours, a mixture of 245 grams of butene-2 (95% purity) and 515 grams of isobutane was added slowly to the reactor. The contents of the reactor were stirred for an additional 2 hours; were permitted to settle and then sampled for analysis.

In run No. 54, the reactor was charged with 100 grams of the powdered salt, 1285 grams of isobutane and 90 grams of $BF_3$. Over a period of 2½ hours, a mixture of 340 grams of isobutane, 126 grams of propylene (95% purity) and 158 grams of ethylene (95% purity) was added. The contents of the reactor were then stirred for an additional 2 hours before being settled and sampled. The results of runs 53 and 54 are set out in Table IX. Run No. 53 shows that butene-2 alkylated the isobutane to produce a reasonably good yield of depentanized alkylate. More than half of this alkylate boiled in the important $C_6$–$C_8$ range. Run No. 54 shows that a mixture of ethylene and propylene gave an excellent yield of alkylate having a very favorable distribution of the desired $C_6$–$C_8$ materials.

TABLE VI

*Effect of reaction pressure*

[Salt: Ferric pyrophosphate.$9H_2O$.]

| Run No. | 42 | 43 | 44 |
|---|---|---|---|
| Conditions: | | | |
| Average Pressure (P. s. i. g.) | 300 | 600 | 1,000 |
| Isobutane/Ethylene (Molar) | 6.0 | 5.9 | 6.0 |
| Space Velocity (Wt.HC/Hr./Wt.Salt) | 0.45 | 0.46 | 0.46 |
| $BF_3$/Ethylene (Weight) | 1.6 | 1.3 | 1.2 |
| Hydrocarbon/$BF_3$ (Weight) | 9.1 | 10.3 | 11.6 |
| Run Length (Hours) | 10 | 10 | 10 |
| Temperature Range (P. s. i. g.) | 30-35 | 30-40 | 30-40 |
| Yields (Wt. Percent on $C_2$= Charged—based on Pody and MS Analyses): | | | |
| i-$C_5$ and $C_5$= | 49 | 28 | 23 |
| $C_6$ | 92 | 82 | 79 |
| $C_7$+ | 87 | 103 | 73 |
| Alkylate (Depentanized) | 179 | 185 | 152 |
| Alkylate (Debutanized) | 228 | 213 | 175 |
| Ethylene Converted, Percent | 99 | 96 | 96 |

TABLE VII

*Isobutane : ethylene ratio*

[Salt: Ferric pyrophosphate.9H₂O.]

| Run No | 45 | 46 | 47 | 48 |
|---|---|---|---|---|
| Conditions: | | | | |
| Isobutane/Ethylene(Molar) | 3.1 | 5.9 | 10.1 | 5.8 |
| Space Velocity (Wt.$_{HC}$/Hr./Wt.$_{salt}$) | 0.40 | 0.46 | 0.46 | 0.46 |
| BF₃/Ethylene (Weight) | 0.7 | 1.3 | 2.0 | 1.2 |
| Hydrocarbon/BF₃ (Weight) | 11.8 | 10.3 | 11.4 | 11.4 |
| Run Length (Hours) | 8 | 10 | 15 | 9 |
| Temperature Range (° C.) | 30–40 | 30–40 | 32–36 | 30–36 |
| Average Pressure (P. s. i. g.) | 600 | 600 | 600 | 600 |
| Yields (Wt. Percent on C₂= Charged—based on Pody and MS Analyses): | | | | |
| i-C₅ and C₅= | 23 | 28 | 30 | 35 |
| C₆ | 69 | 82 | 102 | 65 |
| C₇+ | 99 | 103 | 68 | 60 |
| Alkylate (Depentanized) | 168 | 185 | 170 | 125 |
| Alkylate (Debutanized) | 191 | 213 | 200 | 160 |
| Ethylene Converted, Percent | 99 | 96 | 91 | 85 |

TABLE VIII

*Effect of space velocity*

[Salt: Ferric pyrophosphate.9H₂O.]

| Run No | 49 | 50 | 51 | 52 |
|---|---|---|---|---|
| Conditions: | | | | |
| Space Velocity (Wt.$_{HC}$/Hr./Wt.$_{salt}$) | 0.22 | 0.46 | 0.87 | 1.83 |
| Isobutane/Olefin (Molar) | 5.8 | 5.8 | 5.8 | 5.8 |
| BF₃/Ethylene (Weight) | 1.3 | 1.2 | 1.3 | 1.3 |
| Hydrocarbon/BF₃ (Weight) | 10.7 | 11.4 | 10.2 | 11.1 |
| Run Length (Hours) | 13½ | 9 | 4¾ | 2 |
| Temperature Range (° C.) | 30–34 | 30–36 | 30–36 | 30–37 |
| Average Pressure (p. s. i. g.) | 600 | 600 | 600 | 600 |
| Yields (Wt. Percent on C₂= Charged—based on Pody and MS Analyses): | | | | |
| i-C₅ and C₅= | 31 | 35 | 43 | 24 |
| C₆ | 89 | 65 | 63 | 20 |
| C₇+ | 63 | 60 | 31 | 31 |
| Alkylate (Depentanized) | 152 | 125 | 94 | 51 |
| Alkylate (Debutanized) | 183 | 160 | 137 | 75 |
| Ethylene Converted, Percent | 92 | 85 | 85 | 56 |
| Catalyst Age (Actual run time, hrs.) | 116 | 85 | 109 | 139 |

TABLE IX

*Olefin-isobutane alkylation*

[Salt: Nickel pyrophosphate.4H₂O.]

| Run No | 53 | 54 |
|---|---|---|
| Olefin | Butene-2 | Ethylene-Propylene |
| External I/O (Molar) | 6/1 | 8.6/1.9/1(i-C₄/ C₂=/C₃=) |
| Olefin/BF₃/Salt (Wt.) | 2.3/1/1 | 2.7/1/1 |
| Time (Hours) | 4.5 | 4.5 |
| Temperature (° C.) | 45 | 45–50 |
| Pressure (p. s. i. g.) | 260–300 | 250–325 |
| Yields (Wt. Percent on Olefin Charged—Hypercal distillation): | | |
| C₆ (110–165° F.) | } 14 { | 46 |
| C₇ (165–194° F.) | | 12 |
| C₈ (194–266° F.) | 62 | 61 |
| C₉–415° F. | 32 | 39 |
| 415+° F. | 28 | 15 |
| Alkylate (Depentanized) | 136 | 173 |
| Conversion of Olefin, Percent | 95+ | { C₂=85 C₃=81 |

RUN NO. 55

In run No. 55, benzene was contacted with ethylene in the one gallon batch reactor using nickel pyrophosphate.4H₂O and BF₃ as the catalyst pair. The reactor was charged with 1560 grams of C. P. benzene, 90 grams of powdered salt and 150 grams of BF₃. Over a period of 3 hours, 425 grams of technical grade ethylene was added to the reactor and the contents then stirred for an additional 1½ hours. The reaction conditions and yields are set out in Table X below. Infrared inspection of the diethylbenzene produced indicated this to be a mixture of all 3 of the isomers, namely, ortho, meta, and para in about equilibrium distribution.

TABLE X

Charge:
  Benzene/C₂= (mols) _____ 1.3/1
  C₂=/BF₃/Ni₂P₂O₇.4H₂O (wt.) _____ 4.5/1/1
Conditions:
  Time (hours) _____ 4.5
  Temperature (° C.) _____ 70–80
  Pressure (p. s. i. g.) _____ 270–640
Yields (mol percent on C₂=charged):
  Ethylbenzene _____ 28
  Diethylbenzene _____ 5
Ethylene converted (percent) _____ 90

RUN NO. 56

In run No. 56, toluene was reacted with ethylene using ferric pyrophosphate.7H₂O and BF₃ as the catalyst pair. The reaction was carried out in a one gallon stirred monel autoclave. To the autoclave were charged 1380 grams of C. P. toluene, 90 grams of the salt and 90 grams of BF₃. Over a period of 4 hours, 350 grams of technical grade ethylene were added to the autoclave. The contents of the reactor were stirred for an additional half hour before settling and removal of the hydrocarbon materials. The conditions and results are set out in Table XI. Infrared analysis of the ethyltoluene fraction showed that the product distribution was surprisingly different from equilibrium. The ethyltoluene isomer distribution was about: Ortho, 60%, meta, 20%, and para, 20%. This distribution indicates that this particular catalyst pair is particularly suitable for the preparation of ethyltoluene when raw material for the production of phthalic anhydride is the chief want.

TABLE XI

| Run No | 56 |
|---|---|
| Pyrophosphate | Fe₄(P₂O₇)₃.7H₂O |
| Reaction Conditions: | |
| Time (Hours) | 4¾ |
| Pressure (p. s. i. g.) | 170–400 |
| Temperature (° C.) | 30–35 |
| Toluene/Salt (Weight) | 15.3 |
| Toluene/Ethylene (Molar) | 1.5 |
| BF₃/Ethylene (Weight) | 0.4 |
| Yields (On Toluene Converted): | |
| Ethyltoluene (Mol Percent) | 73.8 |
| C-11 Aromatics (Mol Percent)[1] | 14.4 |
| C-12+ Products (Wt. Percent) | 33.8 |
| Toluene Converted | 29.8 |
| Ethylene Converted [2] | 83.0 |

[1] Infrared could not distinguish between mono-butyl and di-ethyl toluene.
[2] Approximate—based on pressure drop.

RUN NO. 57

In run 57, the effectiveness of supporting the salt on a carrier was examined. In this run, nickel pyrophosphate.5H₂O was supported on a gel alumina. The supported solid member of the catalyst pair was prepared by impregnating commercial gel alumina with an aqueous solution of nickel pyrophosphate-ammonia complex; the impregnated alumina was then heated to remove water and decompose the complex; water was added to the heated alumina in an amount sufficient to rehydrate the nickel pyrophosphate. The finished solid catalyst member was obtained by drying the material at 110° C. The solid member contained 8 weight percent of nickel pyrophosphate.

The alumina-salt solid was charged to the flow reactor and contacted with $BF_3$ in order to form the salt hydrate-$BF_3$ complex. The run was carried out utilizing isobutane and ethylene as the reactants. The conditions and results of run No. 57 are set out in Table XII. This run shows that an effective catalyst can be prepared by supporting the metal pyrophosphate hydrate salt on a solid support such as alumina. Other carriers, such as pumice, fused alumina, silica, silica alumina and carbon may also be used.

TABLE XII

| Run No. | 57 |
|---|---|
| Conditions: | |
| I/O (Molar) | 2.9/1 |
| Pressure (p. s. i. g.) | 300 |
| Temperature (° C.) | 30–40 |
| $Wt._{HC}/Hr./Wt._{Cat}$ [1] | 0.64 |
| $BF_3$/Olefin [2] | 0.6 |
| Run Length (Hours) [3] | 5.3 |
| Yields: | |
| $C_6$ | 55 |
| $C_7+$ | 57 |
| Alkylate (Depentanized) | 112 |
| Ethylene Converted | 82 |

[1] Based on weight of pellets only—not $BF_3$.
[2] $BF_3$ added during run.
[3] On stream time exclusive of line-out.

RUN NO. 58

In the flow runs set out previously, the isobutane and ethylene mixture had been premixed with $BF_3$ prior to contacting the feed with the hydrated salt member of the catalyst pair. In runs 58 and 58a, a comparison was made between operation without premixing of the $BF_3$ and the hydrocarbon feed and operation with premixing. In these runs, the catalyst pair consisted of ferric pyrophosphate.$9H_2O$ and $BF_3$. The hydrocarbon feed consisted of isobutane and ethylene. In run No. 58, the hydrocarbon stream and $BF_3$ were not premixed. In run No. 58a, the two streams were premixed. The results of these two tests are set out in Table XIII. The yields, the ethylene conversion, and the ratio of the $C_6$ product to $C_7+$ product indicate that within experimental error there is no difference in operation between premixing the $BF_3$ with the hydrocarbon feed and not premixing the $BF_3$ with the hydrocarbon feed and introducing it separately into the reaction zone.

TABLE XIII

| Run No. | 58a Premixed | 58 Not Premixed |
|---|---|---|
| $BF_3$-Hydrocarbon Streams | | |
| Conditions: | | |
| I/O (Molar) | 5.5/1 | 5.5/1 |
| $BF_3/C_2=$ (Wt.) | 0.7/1 | 0.6/1 |
| Hydrocarbon/$BF_3$ (Wt.) | 19.2/1 | 22.3/1 |
| $Wt._{HC}/Hr./Wt._{Cat}$ | 0.47 | 0.49 |
| Yields (MS and Pody) [1]: | | |
| $C_5$ | 45 | 52 |
| $C_6$ | 94 | 104 |
| $C_7+$ | 99 | 107 |
| Total Alkylate (Depentanized) | 193 | 211 |
| $C_6/C_7+$ Ratio | .95/1 | .97/1 |
| Ethylene Converted, Percent | 100 | 100 |

[1] Wt. percent on $C_2=$ charged.

RUN NO. 59

In the flow work, there was clear evidence of a gradual decline of catalyst activity as the run progressed. Inspection of the catalyst from flow runs showed the presence of a dark gummy coating over the catalyst. In run 59, deactivated ferric pyrophosphate.$9H_2O$ salt was washed several times with xylene and then with hot benzene until the washings were fairly clear. The washed salt was dried for one hour at 110° C. in a forced-draft oven. The dried salt was then used in the standard batch reactor procedure for isobutane-ethylene alkylation in order to test its activity.

In run 59a, another portion of the deactivated salt was extracted over a period of 8 hours in a Soxhlet extractor with hot toluene; this represented 10 extraction cycles. The toluene extracted salt was washed several times with benzene. The benzene-washed salt was dried for 2 hours at 110° C. in a forced-draft oven. This dried salt was then used as the salt member of the catalyst pair in a standard test for ethylene-isobutane alkylation.

A run 59b was made with fresh ferric pyrophosphate.$9H_2O$ from the same batch that had been used in the flow run which produced the deactivated salt; this run affords a reference point for the reactivated salt runs 59 and 59a. The yields of these runs are set out in Table XIV. The runs show that the reactivated catalyst is at least as effective as the fresh catalyst. These runs indicate that catalyst salt deactivation is a coating phenomenon and does not indicate any loss of water of hydration from the salt during the reaction.

TABLE XIV

*Standard isobutane-alkylation tests using fresh and reactivated ferric pyrophosphate (with $BF_3$)*

| Run No. | 59b Fresh | 59 Reactivated by batch washing with hot benzene | 59a Reactivated by continuous extraction with hot toluene |
|---|---|---|---|
| Yields [1] (Pody): | | | |
| i-$C_5$ | 34 | 18 | 21 |
| $C_6$ | 63 | 64 | 71 |
| $C_7+$ | 89 | 78 | 91 |
| Alkylate (Depentanized) | 152 | 142 | 162 |
| $C_2=$ Converted | 86 | 85 | 88 |

[1] Wt. percent on ethylene charged.

RUNS 62 THROUGH 69

Data were obtained on operating at low ambient pressures and also relatively low temperatures down to about −20° C. In order to utilize shorter reaction times, these tests were carried out in a reactor provided with a propeller stirrer driven by a motor. For this reason, these are known as "stirred batch runs."

Table XV contains data from stirred batch runs using powdered $BF_3$-$Fe_4(P_2O_7)_3$.$9H_2O$ catalyst. These runs were made in a 4.6 liter carbon steel stirred reactor as follows: Technical grade isobutane (600 g.) and powdered $Fe_4(P_2O_7)_3$.$9H_2O$ (200 g.) were charged to the reactor. $BF_3$ (250 g.) was pressured in with stirring and external cooling over a 15–30 minute period. The reactor contents were stirred for one hour to allow the $BF_3$ to complex with the ferric pyrophosphate. Then a 3/1 isobutane-ethylene blend (1,750 ml.) was pumped in by water displacement, usually over a 3½ hour period. (The feed passed through a $CaSO_4$-$CaCl_2$ drier before entering the reactor.) After the reaction period, the stirrer was stopped and a sample of the reaction product was drawn rapidly through an alumina bomb for Podbielniak analysis. The remainder of the product was taken for Hypercal distillation.

Reaction temperatures were varied from about 32°

C. to about −20° C. for the runs shown in Table XVI. Overall yields were essentially constant over this range. The dimethylbutanes in the $C_6$ fraction, however increased from about 90% to about 98% when the reaction temperature was reduced from about 32° C. to 0° C. This resulted in a 2–3 F–1 octane boost for the hexane fraction. Octane data are also shown for the $C_8$ alkylate fractions. Those produced at 0° C. and lower had octane ratings 5–6 units higher (86–87 F–1) than those produced at 25–32° C. (80–81 F–1).

The run at −19° C. produced essentially no $C_9+$ product.

TABLE XV

| Run No. | 62 | 63 | 64 | 65 | 66 | 67 | 68 | 69 |
|---|---|---|---|---|---|---|---|---|
| Conditions: | | | | | | | | |
| Temperature (° C.) | 28 to 32 | | 0 to 3 | | −9 to −11 | −17 to −19 | | |
| Total Hydrocarbon/Salt+$BF_3$ (Wt.) | 3.4 | 3.3 | 3.3 | 3.4 | 3.3 | 3.3 | 3.4 | 3.3 |
| I/O (Molar) | 5.5 | 5.6 | 5.3 | 4.9 | 4.9 | 4.9 | 5.0 | 5.1 |
| Time (Hrs.) | 4.0 | 1.0 | 4.0 | 1.0 | 4.0 | 4.0 | 2.0 | 2.0 |
| Pressure Avg. (p. s. i. g.) | ² 275 | ² 285 | ² 420 | 185 | 175 | 165 | 140 | 150 |
| Yields ¹: | | | | | | | | |
| i-$C_5$ | 6 | 11 | 11 | 26 | 0 | 0 | 2 | 3 |
| $C_6$ | 167 | 155 | 178 | | 155 | 170 | | |
| $C_7$ | 3 | 4 | 3 | | 2 | 3 | | |
| $C_8$ | 57 | 51 | 54 | | 63 | 71 | | |
| $C_9+$ | 11 | 10 | 10 | | 20 | 1 | | |
| Alkylate (Depentanized) | 238 | ³ 220 | 245 | ³ 196 | 240 | 245 | 240 | 236 |
| Percent $C_6$ in Alkylate | 70 | 70 | 73 | | 65 | 70 | | |
| Ethylene Converted | 100 | 100 | 95 | 94 | 100 | 100 | 98 | 98 |
| $C_6$ Analysis ⁴: | | | | | | | | |
| 2,3-DMB | 90.0 | 89.2 | 95.9 | 97.5 | 96.9 | 97.0 | 97.6 | 96.8 |
| 3-MP | 2.7 | 3.5 | 1.7 | 0.9 | 0.8 | 0.6 | 0.8 | 1.2 |
| 2,2-DMB | 0.9 | 2.6 | 0.9 | 1.6 | 0.5 | 2.3 | 1.6 | 0.7 |
| 2-MP | 6.2 | 4.5 | 1.5 | 0.0 | 1.8 | 0.0 | 0.0 | 1.3 |
| n-$C_6$ | 0.2 | 0.2 | 0.0 | 0.0 | 0.0 | 0.1 | 0.0 | 0.0 |
| CFR-R ⁵ of $C_6$ Cut | 99.5 | 100.1 | 101.7 | 102.9 | 101.9 | 102.9 | 103.1 | 103.1 |
| CFR-R ⁵ of $C_8$ Cut | 81.0 | 82.0 | 85.4 | 86.3 | 86.7 | 86.5 | 86.6 | 86.7 |

¹ Wt. Percent on ethylene charged. Total yield based on Podbielniak distillation, product distribution on Hypercal distillation.
² Part of this pressure due to nitrogen in reactor.
³ Low total yield probably due to short contact time.
⁴ Mass spectrometer.
⁵ Micro-method.

We claim:

1. An alkylation process comprising contacting (a) an alkylatable feed hydrocarbon from the class consisting of (1) isoparaffin having from 4 to 8 carbon atoms and (2) aromatic hydrocarbon and (b) an olefin having from 2 to 12 carbon atoms, in the presence of a catalyst comprising essentially (i) a metal pyrophosphate salt containing water of hydration, said metal forming an ion from the class consisting of aluminum, beryllium, cadmium, cobaltous, cuprous, ferrous, ferric, manganous, nickelous, stannic, thorium, titanium, zinc and zirconium, and (ii) $BF_3$, said $BF_3$ being present in an amount in excess of about 1 mole per mole of water of hydration in said salt, at a temperature between about −30° C. and a temperature substantially below the temperature at which said hydrate salt decomposes, and at a pressure sufficient to maintain a substantial portion of said reactants in the liquid state, and separating a hydrocarbon product mixture containing alkylate product of said feed hydrocarbon and said olefin.

2. An alkylation process wherein an isoparaffin having from 4 to 8 carbon atoms and an olefin having from 2 to 12 carbon atoms are contacted, in a molar ratio of isoparaffin to olefin between about 2 and 50, at a temperature between about −25° C. and 150° C. and a pressure between about 100 and 2000 p. s. i., said pressure being at least sufficient to keep a substantial portion of said reactants in the liquid state, for a time sufficient to permit an appreciable amount of alkylation reaction to take place, in the presence of a catalyst comprising essentially (i) a metal pyrophosphate salt containing water of hydration, the metal component forming an ion selected from the class consisting of aluminum, beryllium, cadmium, cobaltous, cuprous, ferrous, ferric, manganous, nickelous, stannic, thorium, titanium, zinc and zirconium, and (ii) boron trifluoride, said $BF_3$ being present in an amount in excess of one mole per mole of hydrate water present in said salt, removing a product hydrocarbon mixture from said contacting zone and an alkylate hydrocarbon product is separated from said mixture.

3. The process of claim 2 wherein said isoparaffin is isobutane.

4. The process of claim 2 wherein said isoparaffin is diisopropyl.

5. The process of claim 2 wherein said olefin is ethylene.

6. The process of claim 2 wherein said olefin is propylene tetramer.

7. The process of claim 2 wherein said pyrophosphate is ferric pyrophosphate.

8. The process of claim 2 wherein said pyrophosphate is nickelous pyrophosphate.

9. The process of claim 2 wherein said pyrophosphate is cadmium pyrophosphate.

10. The process of claim 2 wherein said pyrophosphate is cobaltous pyrophosphate.

11. The process of claim 2 wherein said pyrophosphate is ferrous pyrophosphate.

12. The process of claim 2 wherein said temperature is between about −20° C. and +5° C.

13. The process of claim 2 wherein the $BF_3$ is present in an amount, in excess of 1 mole per mole of hydrate water, such that the free-$BF_3$ to olefin weight ratio is between about 0.2 and 1.5.

14. An alkylation process which comprises contacting isobutane and ethylene in a molar ratio of isobutane to ethylene between about 2 and 25 at a temperature between about −20° C. and +5° C. at a pressure between about 200 and 1000 p. s. i., said pressure being sufficient to keep a substantial portion of said reactants in the liquid state for a time sufficient to permit an appreciable amount of alkylation reaction to take place, in the presence of a catalyst pair comprising essentially (a) a salt-$BF_3$ complex consisting of a metal pyrophosphate salt containing water of hydration, the metal component forming an ion selected from the class consisting of aluminum, beryllium, cadmium, cobaltous, cuprous, ferrous, ferric, manganous, nickelous, stannic, thorium, titanium, zinc and zirconium, and about 1 mole of $BF_3$ per mole of hydrate water present in said salt and (b) boron trifluoride in an amount such that the weight ratio of free-$BF_3$ to ethylene charged is at least about 0.2, removing product hydrocarbon mixture containing alkylate product from said contacting zone and separating alkylate hydrocarbon product from unreacted isobutane and ethylene.

15. The process of claim 14 wherein said free-$BF_3$/ethylene weight ratio is between about 0.35 and 1.

References Cited in the file of this patent

UNITED STATES PATENTS

| | | |
|---|---|---|
| 2,307,689 | Layng | Jan. 5, 1943 |
| 2,370,118 | Axe | Feb. 27, 1945 |
| 2,414,206 | Layng | Jan. 14, 1947 |
| 2,507,499 | Cade | May 16, 1950 |
| 2,618,614 | Bielawski et al. | Nov. 18, 1952 |
| 2,748,090 | Watkins | May 29, 1956 |